Dec. 19, 1967 W. H. VAN DER FEYST ET AL Re. 26,326

AUTOMATIC DIAPHRAGM CONTROL FOR AERIAL CAMERA

Original Filed May 8, 1963

INVENTORS
WILLEM HENDRIK VAN der FEYST
DIRK JOHAN GROOT
BY
Dann, Fairbairn & Hirsch
ATTORNEYS United States Patent Office Re. 26,326
Reissued Dec. 19, 1967

26,326
AUTOMATIC DIAPHRAGM CONTROL FOR AERIAL CAMERA

Willen Hendrik van der Feyst and Dirk Johan Groot, Delft, Netherlands, assignors to N.V. Optische Industrie "De Oude Delft," Delft, Netherlands Original No. 3,245,331, dated Apr. 12, 1966, Ser. No. 278,845, May 8, 1963. Application for reissue Sept. 19, 1966, Ser. No. 584,311
7 Claims. (Cl. 352—141)

Matter enclosed in heavy brackets [ ] appears in the original patent but forms no part of this reissue specification; matter printed in italics indicates the additions made by reissue.

*ABSTRACT OF THE DISCLOSURE*

*In a photographic camera having automatic control a focal plane shutter is provided which has a highly diffusely reflective surface parallel to and closely in front of the image window to diffusely reflect light received from the camera lens toward a photocell mounted outside the effective light path between camera lens and focal plane and whose output controls the amount of light incident on the focal plane during an exposure.*

The present invention relates to photographic cameras and, more particularly, to a camera in which a behind-the-lens photosensitive element is used to measure the illumination of the focal plane for the purpose of determining the exposure time and/or the diaphragm stop required for a correct exposure. Such cameras have the advantage over cameras having a separate light path for their exposure meter, that the influence of the field angle of the objective, or of filters etc. is automatically taken into account.

In some known cameras having the above mentioned feature, the photo-electric element is positioned in the bundle of light rays just in front of the focal plane shutter and is temporarily removed each time an exposure should be made. This involves mechanical complications and does not readily permit a continuous measurement, e.g. during a rapid series of exposures.

For cinematographic cameras it has been proposed to provide a rotating shutter disc between the objective lens and the focal plane which disc has on its side turned towards the lens, a silvered surface under 45° with the optical axis. This surface deviates the light bundle leaving the objective lens through 90° and directs it to a photoelectric element which has a fixed position. This conception, though useful in conventional cine-cameras, is not readily applicable to other types of cameras. Since the shutter must rotate in a plane at a considerable angle to the focal plane, it must show a poor shutter efficiency for short exposures because of its relatively large distance to the focal plane. Moreover, the conception requires a completely rigid and undeformable shutter construction so that other well-known types of focal plane shutters, such as roller blind shutters, cannot be used.

Accordingly, it is the main object of the present invention to provide light measuring means of the type indicated in photographic, including cinematographic, cameras which avoid the above mentioned drawbacks of known apparatus and is widely applicable.

In accordance with the general aspect of this invention, a focal plane shutter is provided comprising a diffusely reflecting surface which is parallel to the focal plane of the camera. Light transmitted by the objective lens is diffusely reflected by said reflecting shutter surface and received by a photosensitive element which is mounted outside the path of light between the lens and the focal plane.

Other objects and features of the present invention will readily appear from the following description of one embodiment thereof in application to a camera for making series of exposures in rapid succession.

Figure 1:
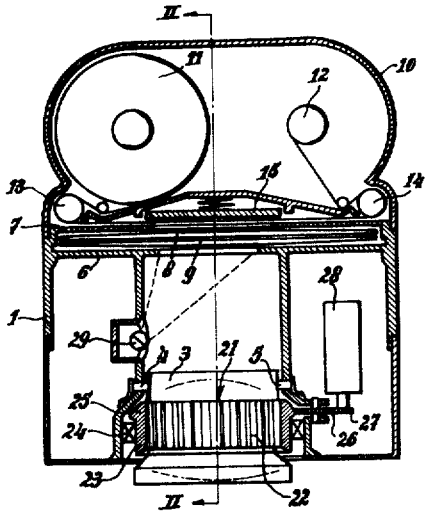
FIG. 1 is a cross-section through the axis of the camera.
Figure 2:
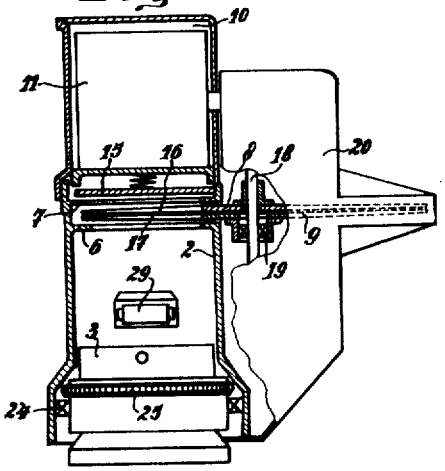
FIG. 2 is a cross-section of the camera along the plane II—II in FIG. 1.

The camera as shown has a housing 1 with a cylindrical lens hood 2, in which an objective 3 is mounted which is prevented from sliding and rotating by means of spring urged pins 4, 5. Two discs 8 and 9 forming a well known type of focal plane shutter are provided on the upper side of housing 1 between walls 6 and 7 in each of which a window has been made. On top of the housing there is provided a daylight film cassette comprising film spools 11, 12, driving rollers 13, 14 and a spring-suspended film pressing plate 15.

The focal plane shutter consists of the circular discs 8 and 9 which each have one or more exposure slots 16, 17 and which are driven at differential speeds such that a slot of the first disc periodically coincides with a slot of the second disc in front of the image window so that an exposure is achieved. Disc 8 is fixed upon a shaft 18 while disc 9 is rotatably supported on shaft 18 by means of a bearing 19. Disc 9 is coupled to shaft 18 by means of gear-wheels not shown, in order to obtain the desired speed ratio. A driving motor and a mechanism for coupling the driving rollers for the film with the shutter are housed in a separate part 20 of the camera housing.

The objective 3 has a stop, the aperture of which can be adjusted by turning a dial ring 21. This dial ring is provided with a rim of slots 22, in one of which an internal notch (not visible) of a sleeve 23 is received. This sleeve is rotatable in lens hood 2 by means of bearing 24. A gear rim 25 on sleeve 23 is in engagement with a gearwheel 26 which engages the pinion 27 of control motor 28.

A photo-electric cell 29 is fixed in a recess of the lens hood 2 at some distance from the shutter discs in such manner that it receives a part of the light diffusely reflected by shutter disc 9. The cell is situated outside the bundle of rays between objective 3 and the focal plane so it does not disturb the exposure. A sufficient illumination of cell 29 can be obtained if the side of shutter disc 9 turned towards the objective is made wholly or partly diffusely reflective e.g. with the aid of white paint.

The electrical signal of cell 29 which may be made to contain an A.C. component, e.g. by providing shutter disc 9 with alternating white and dull black sectors, may be compared in a conventional way with a reference signal. The difference signal may be used, after amplification, for controlling the stop-control motor 28. In this way a continuous and fast automatic exposure control may be obtained, which will ensure that a fixed average illumination of the focal plane is maintained. It is likewise possible to vary the reference signal according to the sensitivity of the film and to the speed at which the shutter is driven, thus adapting the illumination to these data. The speed of the shutter discs can be measured, if desired, from the frequency of the A.C. component in the signal of cell 29 is disc 9 is provided with alternating sectors of different reflectivities as mentioned above.

As regards the many variations that can be applied within the scope of the present invention, mention is made of the possibility to use a number of photo-electric cells or a single annular photo-electric cell. It is self evident that there may be used also other conventional types of shutters which can be positioned in front of the focal surface, e.g. roller blind shutters.

We claim:

1. In a photographic camera, the combination of an optical objective, a window behind said objective, a movable shutter means closely adjacent said window having a diffusely reflecting surface substantially parallel to the plane of said window, means intermittently to vary the intensity of the light reflected by the reflecting surface of said shutter means, photo sensitive means mounted outside the path of the bundle of light rays between said objective and said window so as to directly receive a part of the diffused light reflected by said surface, said shutter means having an aperture through which light from said optical objective may pass, means to compare the output signal from said photo sensitive means with a reference signal and means controlled by the differences between said two signals to vary the speed of movement of said shutter.

2. The combination set forth in claim 1 in which said shutter is a focal plane shutter comprising a flat opaque member in front of and parallel to the focal plane of said camera.

3. In a photographic camera the combination set forth in claim 2, wherein said focal plane shutter comprises at least a disc having a radial exposure slit and arranged for rotation about an axis parallel to the optical axis of said objective.

4. In a photographic camera, the combination set forth in claim 1, wherein said diffusely reflecting surface is provided with alternating portions of different reflectivity whereby, during movement of said shutter means, the illumination of said photosensitive means periodically varies at a frequency determined by the speed of motion of said shutter means.

*5. In a photographic camera having automatic exposure control, the combination of an optical objective, an image window substantially in the focal plane of said objective, focal plane shutter means arranged closely adjacent said image window for movement past said image window, said focal plane shutter means having a diffusely reflective surface substantially parallel to the focal plane and so arranged that light from said objective is incident thereon at times when said surface is in conjunction with said image window, photosensitive means mounted outside the path of light between said objective and said image window so as to directly receive light diffusely reflected by said surface, and means to effectively control the amount of light incident on said focal plane during exposure in response to an output of said photosensitive means.*

*6. The combination set forth in claim 5 in which the focal plane shutter means comprises a flat opaque member in front of and parallel to the focal plane and arranged for movement past said image window, said member having an exposure slit extending transversely to the direction of movement and a surface turned towards said objective, diffusely reflecting light received from said objective.*

*7. The combination set forth in claim 5 in which the focal plane means comprises at least one flat circular disc having a radial exposure slit and arranged for rotation about an axis perpendicular to the focal plane, said disc having a diffusely reflective area on its surface turned towards said objective.*

References Cited

The following references, cited by the Examiner, are of record in the patented file of this patent or the original patent.

UNITED STATES PATENTS

| | | | |
|---|---|---|---|
| 2,429,972 | 11/1947 | Aiken | 95—61 |
| 2,996,952 | 8/1961 | Orlando | 95—10 |
| 3,016,810 | 1/1962 | Oxspring et al. | 95—10 |
| 3,124,033 | 3/1964 | Frendenschuss | 95—64 |
| 3,116,670 | 1/1964 | Ball | 95—57 X |
| 3,170,159 | 2/1965 | Goldberg et al. | 352—208 X |

NORTON ANSHER, *Primary Examiner.*

J. F. PETERS, *Assistant Examiner.*